Madden & Haserot.
Bread-Cutter.

Nº 73017

Patented Jan. 7, 1868.

Witnesses
E. E. Waite
Frank S. Alden.

Inventor
John Madden
J. G. Haserot

United States Patent Office.

JOHN MADDEN AND I. G. HASEROT, OF CLEVELAND, OHIO.

Letters Patent No. 73,017, dated January 7, 1868.

---

IMPROVED BREAD-CUTTER.

---

*The Schedule referred to in these Letters Patent and making part of the same.*

---

TO ALL WHOM IT MAY CONCERN:

Be it known that we, JOHN MADDEN and I. G. HASEROT, of Cleveland, in the county of Cuyahoga, and State of Ohio, have invented certain new and useful Improvements in Bread-Cutter, &c.; and we do hereby declare that the following is a full and complete description of the same, reference being had to the accompanying drawings, making a part of this specification, in which—

Like letters of reference refer to like parts in the views.

Figure 1:
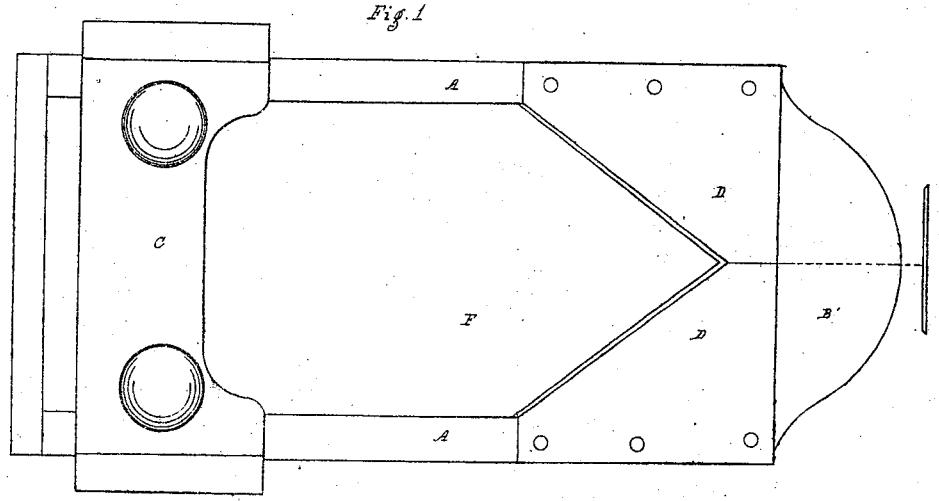
Figure 1 is a top view.
Figure 2:
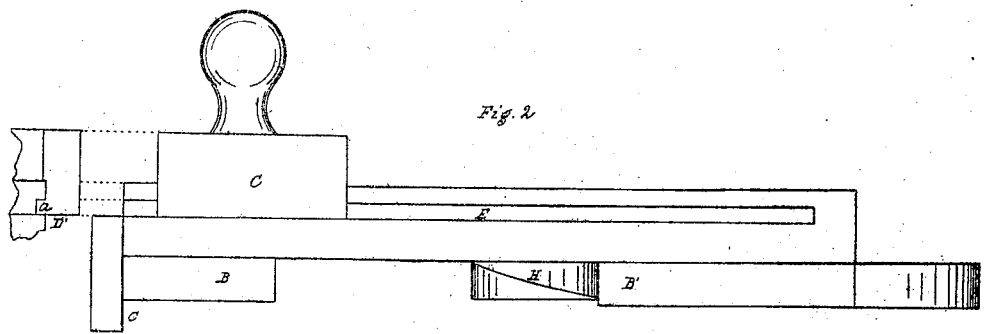
Figure 2 is a side view.
Figure 4:
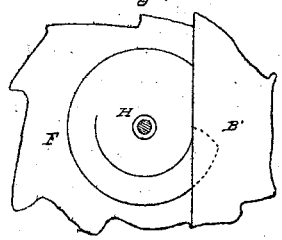
Figure 4 is a detached section, to which reference will be made in the description.
Figure 3:
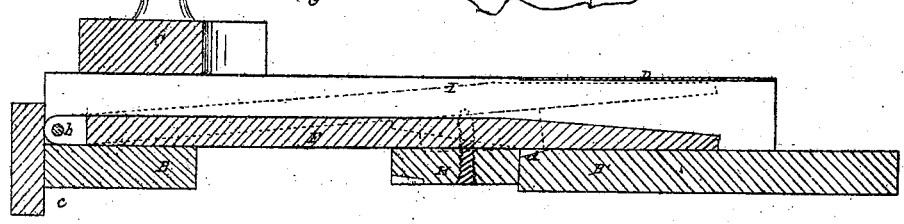
Figure 3 is a vertical section.

This cutter consists of the side pieces A A, fig. 1, secured together by the boards B B' on the under side, the hand-slide C, and knives or blades D. In the side of the pieces A is cut the groove E, fig. 2, in which moves the tongue $a$, an end view of which is shown at D'. F, fig. 3, is an adjustable table, pivoted or hung at $b$. Secured to the under side of this table is a spiral cam, H, an under side view of which is shown in fig. 4. This table and cam are for the purpose of varying the thickness of the slice to be cut. At one end of the cutter or pieces, A, is formed a shoulder, $c$, which is to come against the edge of the table on which the cutter is placed to be used, so as to prevent its moving about.

When the bread is to be cut, the table is adjusted to suit the thickness of the slice required, by means of the cam H. If to be thick, the table can be left in the position indicated, but the slice can be cut thinner, more or less, by turning the cam H, as desired, which, being spiral when it is turned, will pass on to the end of the board B', a notch, $d$, cut for this purpose, thus raising the table, as indicated by the dotted lines I, fig. 3. When the table is raised to the desired height, according to the thickness of the slice required, as above described, the slide C, in front of which the bread is placed, is moved towards the blades, the tongue $a$ passing in the grooves E, above referred to, thus preventing the slide from getting out of place while being used.

The ends of the knives are lapped together, an end view of which is shown at J, fig. 1. This is to hold them steady, and prevent their springing and parting. They can also be removed and sharpened, when necessary.

By means of this adjustable table and cam, dried beef, cabbage, &c., anything that is to be cut in thin slices, can be cut as easily as bread, as the table can be raised up or let down, thus adjusting it so that a thick or thin slice may be cut, as desired.

What we claim as our improvement, and desire to secure by Letters Patent, is—

1. Operating the hinged or jointed table F by means of the cam H, substantially as and for the purpose set forth.

2. The adjustable table F and cam H, in combination with the knife, substantially as and for the purpose set forth.

3. The arrangement of the knife in two sections, D D, and jointing the same together, as seen at J, in combination with a table and slide, for the purpose set forth.

JOHN MADDEN,
I. G. HASEROT.

Witnesses:
J. H. BURRIDGE,
M. McBRIDE.